United States Patent
Yu et al.

(10) Patent No.: US 10,854,394 B2
(45) Date of Patent: Dec. 1, 2020

(54) STRETCHABLE CAPACITOR ELECTRODE-CONDUCTOR STRUCTURE

(71) Applicants: Tsinghua University, Beijing (CN); HON HAI PRECISION INDUSTRY CO., LTD., New Taipei (TW)

(72) Inventors: Yang Yu, Beijing (CN); Jia-Ping Wang, Beijing (CN); Kai-Li Jiang, Beijing (CN); Shou-Shan Fan, Beijing (CN)

(73) Assignees: Tsinghua University, Beijing (CN); HON HAI PRECISION INDUSTRY CO., LTD., New Taipei (TW)

( * ) Notice: Subject to any disclaimer, the term of this patent is extended or adjusted under 35 U.S.C. 154(b) by 91 days.

(21) Appl. No.: 16/379,264

(22) Filed: Apr. 9, 2019

(65) Prior Publication Data

US 2020/0006014 A1    Jan. 2, 2020

(30) Foreign Application Priority Data

Jun. 29, 2018 (CN) .......................... 2018 1 0711922

(51) Int. Cl.
| | |
|---|---|
| *H01G 11/36* | (2013.01) |
| *H01G 11/26* | (2013.01) |
| *H01G 11/86* | (2013.01) |
| *H01G 11/56* | (2013.01) |
| *H01G 11/78* | (2013.01) |

(52) U.S. Cl.
CPC ............. *H01G 11/26* (2013.01); *H01G 11/36* (2013.01); *H01G 11/56* (2013.01); *H01G 11/78* (2013.01); *H01G 11/86* (2013.01)

(58) Field of Classification Search
None
See application file for complete search history.

(56) References Cited

U.S. PATENT DOCUMENTS

| | | | |
|---|---|---|---|
| 10,483,050 B1 * | 11/2019 | Yu | .......................... H01G 11/14 |
| 2008/0299460 A1 | 12/2008 | Feng et al. | |
| 2010/0047522 A1 | 2/2010 | Sivarajan et al. | |
| 2011/0096465 A1 | 4/2011 | Zhou et al. | |
| 2011/0097512 A1 | 4/2011 | Zhou et al. | |
| 2011/0108545 A1 | 5/2011 | Wang et al. | |
| 2011/0256451 A1 | 10/2011 | Cui et al. | |

(Continued)

FOREIGN PATENT DOCUMENTS

| | | |
|---|---|---|
| CN | 1357899 | 7/2002 |
| CN | 101315974 | 12/2008 |

(Continued)

*Primary Examiner* — Dion Ferguson
(74) *Attorney, Agent, or Firm* — ScienBiziP, P.C.

(57) ABSTRACT

A stretchable capacitor electrode-conductor structure includes a capacitor electrode and a conductor structure forming an integrated molding. The capacitor electrode includes a plurality of carbon nanotube layers, and an active substance layer is located between adjacent carbon nanotube layers. Both the carbon nanotube layer and the conductor structure include a plurality of super-aligned carbon nanotube films. A surface of the stretchable capacitor electrode-conductor structure comprises a plurality of wrinkles. A stretchable supercapacitor including the stretchable capacitor electrode-conductor structure is also provided.

19 Claims, 13 Drawing Sheets

(56) References Cited

U.S. PATENT DOCUMENTS

| | | | |
|---|---|---|---|
| 2012/0313591 A1* | 12/2012 | Brambilla | C01B 32/162 |
| | | | 320/166 |
| 2013/0045413 A1 | 2/2013 | Wang et al. | |
| 2013/0146215 A1* | 6/2013 | Liu | C01B 32/168 |
| | | | 156/193 |
| 2013/0284695 A1 | 10/2013 | Feng et al. | |
| 2014/0175087 A1 | 6/2014 | Feng et al. | |
| 2015/0207143 A1 | 7/2015 | Wu et al. | |
| 2015/0234513 A1* | 8/2015 | Jiang | H04M 1/0202 |
| | | | 345/174 |
| 2016/0377409 A1* | 12/2016 | Norisada | G01B 7/22 |
| | | | 73/780 |
| 2017/0221645 A1* | 8/2017 | Gangopadhyay | C01B 32/194 |
| 2018/0026258 A1 | 1/2018 | Yan et al. | |
| 2019/0371534 A1* | 12/2019 | Brambilla | H01G 11/28 |
| 2020/0006755 A1* | 1/2020 | Yu | H01M 4/806 |
| 2020/0006772 A1* | 1/2020 | Yu | H01M 10/0585 |

FOREIGN PATENT DOCUMENTS

| | | |
|---|---|---|
| CN | 102103935 | 6/2011 |
| CN | 103159204 | 6/2013 |
| CN | 103903870 | 7/2014 |
| CN | 104538202 | 4/2015 |
| CN | 107565091 | 1/2018 |
| CN | 107611468 | 1/2018 |
| CN | 107644977 | 1/2018 |
| CN | 107747957 | 3/2018 |
| CN | 108155387 | 6/2018 |
| JP | 2011-88813 | 5/2011 |
| JP | 2011-103293 | 5/2011 |
| JP | 2015-138777 | 7/2015 |
| TW | 201343950 | 11/2013 |

\* cited by examiner providing an elastic substrate, and pre-stretching the elastic substrate in a first direction and a second direction intersecting with the first direction, to obtain a pre-stretched elastic substrate

↓ laying a carbon nanotube active material composite layer on a surface of the pre-stretched elastic substrate comprising:
  laying a first carbon nanotube film structure on the surface of the pre-stretched elastic substrate, and the first carbon nanotube film structure being in direct contact with the pre-stretched elastic substrate and comprising a plurality of super-aligned carbon nanotube films stacked with each other, each of the plurality of super-aligned carbon nanotube films comprising a plurality of carbon nanotubes substantially extending in the same direction;
  covering a first mask on a surface of the first carbon nanotube film structure away from the pre-stretched elastic substrate;
  adding an electrode active material to the surface of the first carbon nanotube film structure away from the pre-stretched elastic substrate, to form a first active material layer on a part of the surface of the first carbon nanotube film structure;
  removing the first mask; and
  laying a second carbon nanotube film structure on a surface of the first active material layer away from the pre-elastic substrate, to form the carbon nanotube active material composite layer, and the second carbon nanotube film structure being in direct contact with the surface of the first active material layer and comprises the plurality of super-aligned carbon nanotube films stacked with each other

↓ releasing the pre-stretching of the elastic substrate to restore deformations of the elastic substrate, and forming a plurality of wrinkles on a surface of the carbon nanotube active material composite layer

↓ processing the carbon nanotube active material composite layer to obtain a capacitor electrode and a conductor structure, and the capacitor electrode and the conductor structure forming an integrated molding

FIG. 1 carbon nanotube active material composite film    pure carbon nanotube portion carbon nanotube active material composite film   pure carbon nanotube portion

STRETCHABLE CAPACITOR ELECTRODE-CONDUCTOR STRUCTURE

CROSS-REFERENCE TO RELATED APPLICATIONS

This application claims all benefits accruing under 35 U.S.C. § 119 from China Patent Application No. 201810711922.1, filed on Jun. 29, 2018, in the China National Intellectual Property Administration, the contents of which are hereby incorporated by reference. The application is also related to copending applications entitled, "STRETCHABLE FILM STRUCTURE AND METHOD OF MAKING THE SAME", filed Apr. 9, 2019 (Ser. No. 16/379,287). The application is also related to copending applications entitled, "METHOD FOR MAKING STRETCHABLE CAPACITOR ELECTRODE-CONDUCTOR STRUCTURE", filed Apr. 9, 2019 (Ser. No. 16/379,258). The application is also related to copending applications entitled, "STRETCHABLE COMPOSITE ELECTRODE AND STRETCHABLE LITHIUM ION BATTERY USING THE SAME", filed Apr. 9, 2019 (Ser. No. 16/379,268). The application is also related to copending applications entitled, "METHOD OF MAKING STRETCHABLE COMPOSITE ELECTRODE", filed Apr. 9, 2019 (Ser. No. 16/379,278).

FIELD

The present disclosure relates to a stretchable capacitor electrode-conductor structure.

BACKGROUND

Repeated deformation in different directions often occurs when stretchable electronic devices are used, such as when the stretchable electronic devices are applied in biological tissues. Therefore, the stretchable electronic devices are capable of being not only withstand a single large strain of stretching, but also withstand repeated deformations in different directions. That is, the stretchable electronic devices need to have high tolerance to strain cycles in different directions. Stretchable capacitor is a commonly used stretchable electronic device. In order to be compatible with the working characteristics and working environment of the stretchable capacitor, the stretchable capacitor electrodes and the conductors of the stretchable capacitor need to have the ability to resist repeated stretching in different directions.

Carbon nanotube films have excellent mechanical properties and electrical properties. The carbon nanotube films can be used not only as a conductor but also in combination with active materials to obtain a capacitor electrode with good electrical properties.

However, conventional carbon nanotube electrodes and conductors can only be stretched with small stress in a single direction, and is easily broken when it is repeatedly stretched in different directions at the same time.

Thus there is a room for improvement.

BRIEF DESCRIPTION OF THE DRAWINGS

Implementations of the present technology will now be described, by way of example only, with reference to the attached figures, wherein:

FIG. 1 is a flow diagram of one embodiment of a method of making a stretchable capacitor electrode-conductor structure.

DETAILED DESCRIPTION

Figure 2:
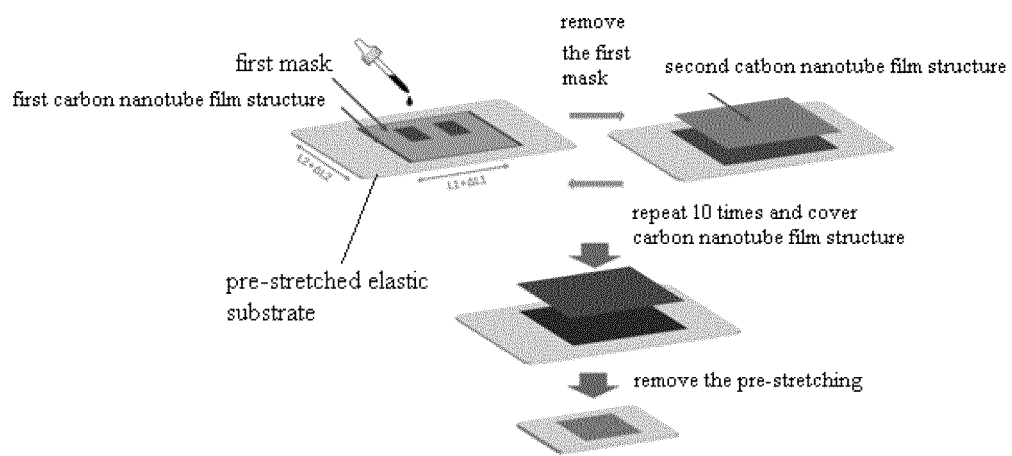
FIG. 2 is a schematic view of the method of making the stretchable capacitor electrode-conductor structure in FIG. 1.

The disclosure is illustrated by way of example and not by way of limitation in the figures of the accompanying drawings in which like references indicate similar elements. It should be noted that references to "another," "an," or "one" embodiment in this disclosure are not necessarily to the same embodiment, and such references mean "at least one."

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts have been exaggerated to illustrate details and features of the present disclosure better.

Several definitions that apply throughout this disclosure will now be presented.

The term "substantially" is defined to be essentially conforming to the particular dimension, shape, or other feature which is described, such that the component need not be exactly or strictly conforming to such a feature. The term "comprise," when utilized, means "include, but not necessarily limited to"; it specifically indicates open-ended inclusion or membership in the so-described combination, group, series, and the like.

FIG. 1 and FIG. 2 show one embodiment of the present application in relation to a method of making a stretchable capacitor electrode-conductor structure. The method comprises:

block (B1), providing an elastic substrate, and pre-stretching the elastic substrate along a first direction and a second direction intersecting with the first direction, to obtain a pre-stretched elastic substrate;

block (B2), laying a carbon nanotube active material composite layer on a surface of the pre-stretched elastic substrate, comprising:

block (B21), laying a first carbon nanotube film structure on the surface of the pre-stretched elastic substrate, and the first carbon nanotube film structure directly contacting with the pre-stretched elastic substrate and comprising a plurality of first super-aligned carbon nanotube films stacked with each other, each of the plurality of first super-aligned carbon nanotube films comprising a plurality of first carbon nanotubes substantially parallel with each other;

block (B22), covering a first mask on a surface of the first carbon nanotube film structure away from the pre-stretched elastic substrate;

block (B23), adding an electrode active material to the surface of the first carbon nanotube film structure away from the pre-stretched elastic substrate, to form a first active material layer on a part of the surface of the first carbon nanotube film structure;

block (B24), removing the first mask; and block (B25), laying a second carbon nanotube film structure on a surface of the first active material layer away from the pre-elastic substrate, to form the carbon nanotube active material composite layer, and the second carbon nanotube film structure directly contacting with the surface of the first active material layer and comprises a plurality of second super-aligned carbon nanotube films stacked with each other;

block (B3), releasing the pre-stretching of the elastic substrate to restore deformations of the elastic substrate, and forming a plurality of wrinkles on a surface of the carbon nanotube active material composite layer; and block (B4), processing the carbon nanotube active material composite layer to obtain a capacitor electrode and a conductor structure, and the capacitor electrode and the conductor structure being formed by integrated molding.

In block (B1), an intersection angle of the first direction and the second direction is not limited. In one embodiment, the first direction is perpendicular with the second direction. When the first direction being perpendicular with the second direction, the elastic substrate can be evenly stretched during pre-stretching; and after the pre-stretching is released, the distribution, size, and shape of the plurality of wrinkles are uniform. Therefore, when the stretchable capacitor electrode-conductor structure is stretched in any direction, the plurality of wrinkles can be unfolded in a stress direction, and a rigidity of the stretchable capacitor electrode-conductor structure in different directions is improved.

In some embodiments, the elastic substrate is pre-stretched in three or more directions so the elastic substrate is in a tensile state, and the three or more directions are symmetrical and intersecting.

A material of the elastic substrate can be selected from silicone rubber, polyvinyl chloride, polytetrafluoroethylene, polyurethane (PU), polyvinyl chloride (PVC), polydimethylsiloxane (PDMS) and the like. In one embodiment, the elastic substrate is a rectangular PDMS substrate with a thickness of 1 mm.

In one embodiment, the elastic substrate is biaxial pre-stretched in each of the first direction the second direction. "Biaxial pre-stretched" refers that the elastic substrate is stretched on both ends in the first direction and the second direction. In one embodiment, the elastic substrate is uniaxial pre-stretched in the first direction and the second direction. "Uniaxial pre-stretched" refers that one end of the elastic substrate is not stretched, and the other end of the elastic substrate is stretched. In one embodiment, a shape of the elastic substrate is a rectangle, the elastic substrate is biaxial pre-stretched both in the first direction and the second direction, the first direction is parallel to a long side of the rectangle, and the second direction is parallel to a short side of the rectangle.

In block (B1), the elastic substrate can be pre-stretched to a same amount of strain in the first direction and in the second direction. In one embodiment, a first pre-stretching degree of the elastic substrate in the first direction is the same as a second pre-stretching degree of the elastic substrate in the second direction. The first pre-stretching degree refers a ratio in percentage of a length of the elastic substrate in the first direction after pre-stretching to that before pre-stretching. The second pre-stretching degree refers a ration in percentage of a length of the elastic substrate in the second direction after pre-stretching to that before pre-stretching.

The pre-stretching degree of the elastic substrate needs to be controlled within an elastic range of the elastic substrate. The pre-stretching degree of the elastic substrate can be selected according to the material of the elastic substrate and actual needs. In one embodiment, the elastic substrate is the PDMS substrate, the first pre-stretching degree and the second pre-stretching degree are both larger than or equal to 150% and less than or equal to 400%. The elastic substrate is pre-stretched by applying an external force to the elastic substrate in both the first direction and the second direction, the external force causes the elastic substrate to be elastically deformed without being damaged. In one embodiment, the elastic substrate is pre-stretched by a clamp.

In block (B21), in one embodiment, the plurality of first carbon nanotubes are differently aligned between adjacent two of the first super-aligned carbon nanotube films to form a grid structure, and alignment directions of the plurality of first carbon nanotubes between adjacent two of the first super-aligned carbon nanotube films intersect with each other/are different. When the first carbon nanotube film structure is stretched, the first carbon nanotube film structure can deform to absorb the stress. Therefore, the first carbon nanotube film structure is not be broken easily when being pulled, and an increase rate of resistance may be slowed down. An angle of the alignment directions of the plurality of first carbon nanotubes between adjacent two of the first super-aligned carbon nanotube films is not limited. In one embodiment, the angle of the alignment directions of the plurality of first carbon nanotubes between adjacent two of the first super-aligned carbon nanotube films is about 90 degrees.

The plurality of first super-aligned carbon nanotube films can be drawn from a super-aligned carbon nanotube array. A method of drawing the plurality of first super-aligned carbon nanotube film from the super-aligned carbon nanotube array comprises block (a): selecting carbon nanotube segments with a certain width from the super-aligned carbon nanotube array, and at a certain speed, and block (b): stretching the carbon nanotube segments to be substantially perpendicular to a growth direction of the super-aligned carbon nanotube array. Thus, the super-aligned carbon nanotube film is obtained. The super-aligned carbon nanotube array comprises a plurality of carbon nanotubes, the plurality of carbon nanotubes are substantially parallel to each other and perpendicular to a surface of a substrate. The super-aligned carbon nanotube array is pure, referring that the super-aligned carbon nanotube array is free with impurities, such as amorphous carbon, residual catalyst metal particles or the like. Examples of the method of making the super-aligned carbon nanotube array are taught by U.S. Pat. No. 7,045,108 to Jiang et al. The plurality of carbon nanotubes of each of the plurality of first super-aligned carbon nanotube films joined end to end by van der Waals forces and extend in the same direction. An arranged direction of the plurality of carbon nanotubes of each of the plurality of first super-aligned carbon nanotube films is substantially parallel to a drawing direction of the plurality of first super-aligned carbon nanotube film.

Figure 3:
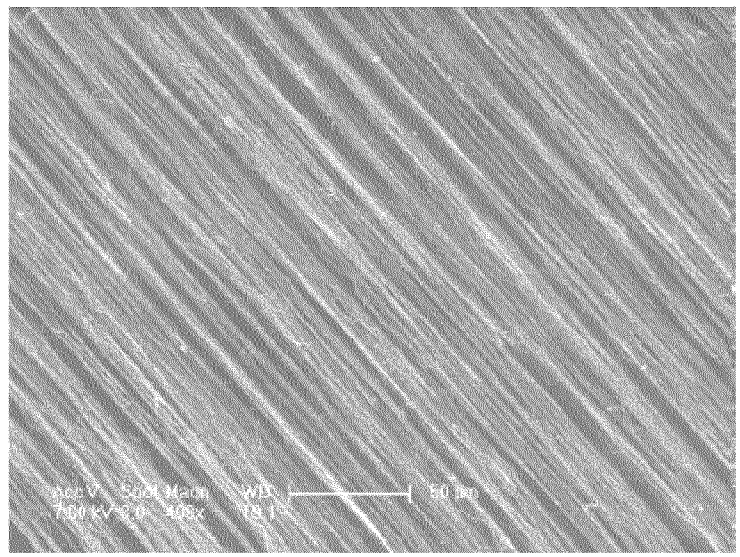
FIG. 3 is a scanning electron microscope image of one embodiment of a super-aligned carbon nanotube film.

FIG. 3 illustrates each of the first super-aligned carbon nanotube films comprises a number of carbon nanotubes that are arranged substantially parallel to a surface of each of the first the super-aligned carbon nanotube film. A large number of the carbon nanotubes of each of the first the super-aligned carbon nanotube film can be oriented along a preferred orientation, meaning that a large number of the carbon nanotubes in each of the first super-aligned carbon nanotube films are arranged substantially along the same direction. An end of one carbon nanotube is joined to another end of an adjacent carbon nanotube arranged substantially along the same direction, by van der Waals force, to form a free-standing film.

A minority of carbon nanotubes in each of the first super-aligned carbon nanotube films may be randomly aligned. However, the number of randomly aligned carbon nanotubes is very small and does not affect the overall oriented alignment of the majority of carbon nanotubes in each of the first super-aligned carbon nanotube films. The majority of the carbon nanotubes in each of the first super-aligned carbon nanotube film substantially aligned along the same direction may not be exactly straight, and can be curved to a certain degree, or are not exactly aligned along the overall aligned direction, and can deviate from the overall aligned direction by a certain degree. Therefore, partial contacts can exist between the randomly aligned carbon nanotubes and adjacent carbon nanotubes.

In one embodiment, the plurality of first super-aligned carbon nanotube films is directly laid on the surface of the pre-stretched elastic substrate after drawn from the carbon nanotube array. The method of laying the first carbon nanotube film structure on the surface of the pre-stretched elastic substrate comprises: drawing a first carbon nanotube film from a carbon nanotube array and laying the first carbon nanotube film on the surface of the pre-stretched elastic substrate; drawing a second carbon nanotube film from the carbon nanotube array and laying the second carbon nanotube film on a surface of the first carbon nanotube film, to make the second carbon nanotube film stack with the first carbon nanotube film; and repeating above steps until the first carbon nanotube film structure is obtained. In one embodiment, the plurality of first super-aligned carbon nanotube films are stacked with each other to form the first carbon nanotube film structure before laying on the surface of the pre-stretched elastic substrate.

A first angle between the extending direction of the carbon nanotubes of the first carbon nanotube film structure and the first direction is not limited; a second angle between the extending direction of the carbon nanotubes of the first carbon nanotube film structure and the second direction is not limited. In one embodiment, the extending direction of the carbon nanotubes of the first carbon nanotube film structure is parallel with the first direction or the second direction.

The first carbon nanotube film structure is pure and substantially free of impurities, and thus the first carbon nanotube film structure has a large viscosity and can be fixed to the surface of the elastic substrate by its own viscosity.

In block (B22), a material of the first mask is not limited. The first mask is a patterned mask. The first active material passes through the patterned mask and forms on the first carbon nanotube film structure. In one embodiment, the size and the shape of patterns on the first mask are designed according to the size and the shape of electrodes of the capacitor, and thus a step of cutting the carbon nanotube active material composite film in the carbon nanotube active material composite layer into a capacitor electrode shape can be omitted. In one embodiment, the first mask is a polyethylene film with two holes; the size and the shape of the two holes are selected according to the size and shape of the two electrodes of the capacitor respectively.

In block B(23), a material of the first active material layer can be any capacitor electrode active material or electrode active material precursor material. For example, the capacitor electrode active material can be activated carbon (AC), manganese dioxide, or cerium oxide. The electrode active material precursor material can be manganese nitrate.

In block B(25), in one embodiment, the plurality of second carbon nanotubes are differently aligned between adjacent two of the second super-aligned carbon nanotube films to form a grid structure, and alignment directions of the plurality of second carbon nanotubes between adjacent two of the second super-aligned carbon nanotube films intersect with each other/are different. An angle of the alignment directions of the plurality of second carbon nanotubes between adjacent two of the second super-aligned carbon nanotube films is not limited. In one embodiment, the angle of the alignment directions of the plurality of second carbon nanotubes between adjacent two of the second super-aligned carbon nanotube films is about 90 degrees.

A method of adding the electrode active material to the surface of the first carbon nanotube film structure away from the pre-stretched elastic substrate comprises: dispersing the electrode active material or the electrode active material precursor into a volatile organic solvent to form a suspension; and uniformly adding the suspension to a part of the surface of the first carbon nanotube film structure through the two holes of the first mask, and forming the first active material layer after the volatile organic solvent is evaporated to no obvious droplets. In one embodiment, dispersing the electrode active material in ethanol using an ultrasonic cell crusher to obtain a suspension, and dropping the suspension on the first carbon nanotube film structure by a pipette.

A plurality of microporous can be formed by the plurality of first super-aligned carbon nanotube films of the first carbon nanotube film structure. When the active material particle size in the first active layer is smaller than the size of the microporous, the first active layer can be partially embedded in the first carbon nanotube film structure.

In one embodiment, block (B2) further comprises block (B26) after block (B25). Block (B26) comprises covering a second mask on a surface of the second carbon nanotube film structure away from the pre-stretched elastic substrate; adding the electrode active material to the surface of the second carbon nanotube film structure away from the pre-stretched elastic substrate, to form a second active material layer on a part of the surface of the second carbon nanotube film structure; removing the second mask; and laying a third carbon nanotube film structure on a surface of the second active material layer away from the pre-elastic substrate, and the third carbon nanotube film structure comprising a plurality of third super-aligned carbon nanotube films stacked with each other, each of the plurality of third super-aligned carbon nanotube films comprising a plurality of carbon nanotubes substantially parallel with each other; and repeating block (B26) to a predetermined thickness of the carbon nanotube active material composite layer.

The structure of the plurality of second super-aligned carbon nanotube film and the structure of the plurality of third super-aligned carbon nanotube film are the same as the structure of the plurality of first super-aligned carbon nanotube films. The method of making the plurality of second super-aligned carbon nanotube films and the method of making the structure of the plurality of third super-aligned carbon nanotube films are the same as the method of making the plurality of first super-aligned carbon nanotube films.

A material of the second active material and a method of adding the second active material layer are both the same as those of the first active material layer. A coverage position of the second mask is the same as a coverage position of the second mask. That is, the positions of the holes in the first mask overlaps with the positions of the holes in the second mask. In one embodiment, the plurality of third carbon nanotubes are differently aligned between adjacent two of the third super-aligned carbon nanotube films to form a grid structure, and alignment directions of the plurality of third carbon nanotubes between adjacent two of the third super-aligned carbon nanotube films intersect with each other/are different. An angle of the alignment directions of the plurality of third carbon nanotubes between adjacent two of the third super-aligned carbon nanotube films is not limited. In one embodiment, the angle of the alignment directions of the plurality of third carbon nanotubes between adjacent two of the third super-aligned carbon nanotube films is about 90 degrees.

In the stretchable capacitor electrode-conductor structure, the active material layer is wrapped between the carbon nanotube film structures to form a sandwich structure. The number of super-aligned carbon nanotube films in each carbon nanotube film structure can be equal or unequal. In one embodiment, each of the number of super-aligned carbon nanotube films in the first carbon nanotube film structure and the number of super-aligned carbon nanotube films in the outermost carbon nanotube film structure is larger than the number of super-aligned carbon nanotube films in an internal carbon nanotube film structure. The outermost carbon nanotube film structure refers to the carbon nanotube film structure which is the farthest from the elastic substrate. The internal carbon nanotube film structure refers to the carbon nanotube film structure located between the first carbon nanotube film structure and the outermost carbon nanotube film structure. In this embodiment, the active material layer can be well carried.

In one embodiment, the block (B26) is repeated for 9 times, and the carbon nanotube active material composite layer comprises 12 carbon nanotube film structures and 11 active material layers. Each of the first carbon nanotube film structure and the outermost carbon nanotube film structure comprises 6 super-aligned carbon nanotube films. Each internal carbon nanotube film structure comprises 2 super-aligned carbon nanotube films.

In block (B3), since the carbon nanotube active material composite layer is bonded to the surface of the elastic substrate, after releasing the pre-stretching of the elastic substrate, a length of the elastic substrate in the first direction and a length of the elastic substrate in the second direction are shortened, and the elastic substrate returns to the original form before the pre-stretching. The plurality of carbon nanotubes of the carbon nanotube active material composite layer bend along a direction substantially perpendicular to the surface of the elastic substrate and form a number of wave shaped protuberances. Namely, some portions of the carbon nanotubes are higher than other portions of the carbon nanotubes. The carbon nanotube active material composite layer comprises a plurality of wrinkles formed by the wave shaped protuberances. When the stretchable capacitor electrode-conductor structure is stretched in any one direction or simultaneously stretched in many different directions, the plurality of wrinkles can be unfolded in the stress direction; the carbon nanotubes of the stretchable capacitor electrode-conductor structure are not broken, the integrity of the stretchable capacitor electrode-conductor structure is maintained, and thus the resistance stretchable capacitor electrode-conductor structure maintains stability when stretched by large strain. If the stress is less than or equal to the pre-stretching degree of the elastic substrate, the deformation of the plurality of wrinkles is reversible, and thus the stretchable capacitor electrode-conductor structure can be reused, and the stretchable capacitor electrode-conductor structure has well resistance stability and tensile cycle performance under large strain.

In block (B4), a method of processing the carbon nanotube active material composite layer comprises cutting the carbon nanotube active material composite film in the carbon nanotube active material composite layer into a capacitor electrode, and cutting a pure carbon nanotube portion in the carbon nanotube active material composite layer into a conductor structure. In one embodiment, cutting the carbon nanotube active material composite film and the pure carbon nanotube portion by a laser.

In one embodiment, further comprising a block of removing the elastic substrate after block (B4).

The method can simultaneously obtain the capacitor electrode and the conductor, which is simple.

EXAMPLE 1

Figure 4:
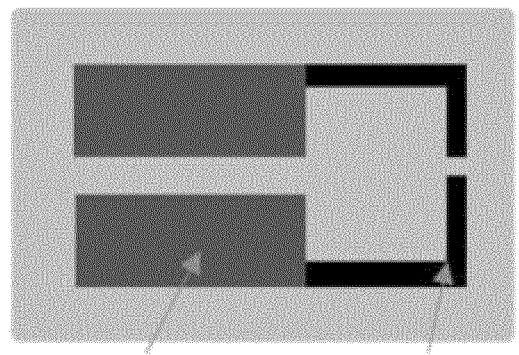
FIG. 4 is a structure schematic view of example 1 of a stretchable capacitor electrode-conductor structure.

In this example, a stretchable capacitor electrode-conductor structure is made, the capacitor electrode of the stretchable capacitor electrode-conductor structure comprises a PDMS substrate, a super-aligned carbon nanotube film, and activated carbon, and the conductor is a pure carbon nanotube. A method of making the stretchable capacitor electrode-conductor structure comprises step (I) of pre-stretching the PDMS substrate in the length direction and width direction of the PDMS substrate, and both the pre-stretching degree in the length direction and width direction are 150%. Step (II) of removing a 6-layer super-aligned carbon nanotube cross film from a 75 mm×75 mm aluminum alloy frame and laying it onto the pre-stretched PDMS substrate. Step (III) of covering a polyethylene film on the 6-layer super-aligned carbon nanotube cross film, the polyethylene film being as a first mask; dispersing 45 mg of activated carbon powder in 60 mL of ethanol using a cell pulverizer to form a dispersion, dropping 6 mL of the dispersion on a portion of the 6-layer super-aligned carbon nanotube cross film by a pipette. Step (IV) of removing the first mask after the ethanol is evaporated to no obvious droplets, and an AC active material layer is formed. Step (V) of covering two-layer super-aligned carbon nanotube cross film on the AC active material layer, covering the polyethylene film on the two-layer super-aligned carbon nanotube cross film, the polyethylene film being as a second mask. Step (VI) of dropping 6 mL of the dispersion on a portion of the two-layer super-aligned carbon nanotube cross film by the pipette, and removing the second mask after the ethanol is evaporated to no obvious droplets, and an AC active material layer is formed, repeating step (VI) for 9 times. And step (VI) of covering a 6-layer super-aligned carbon nanotube cross film, releasing the pre-stretching of the PDMS substrate, and cutting a pure carbon nanotube portion into a conductor structure as shown in FIG. 4 by a laser in the case of ensuring the integrity of the PDMS substrate. In this example, the stretchable capacitor electrode-conductor structure comprises 12 carbon nanotube film structures and 11 active material layers. Each of the first carbon nanotube film structure and the outermost carbon nanotube film structure comprises 6 super-aligned carbon nanotube films. The internal carbon nanotube film structure comprises 2 super-aligned carbon nanotube films.

EXAMPLE 2

Figure 5:
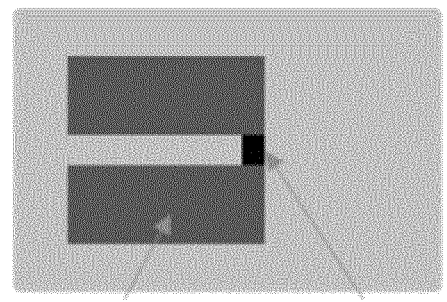
FIG. 5 is a structure schematic view of example 2 of a stretchable capacitor electrode-conductor structure.

The difference between this example and the example 1 is only that the conductor structure obtained by cutting the pure carbon nanotube portion is different from that of example 1. The conductor structure in this example is shown as FIG. 5.

COMPARATIVE EXAMPLE 1

In this comparative example, a stretchable capacitor electrode-conductor structure is made, the capacitor electrode of the stretchable capacitor electrode-conductor structure comprises a PDMS substrate, a super-aligned carbon nanotube film, and activated carbon, and the conductor is a pure carbon nanotube. The difference between the method of making the stretchable capacitor electrode-conductor structure and that of example 1 is only in that the PDMS substrate in this comparative example 1 is not pre-stretched.

Figure 6:
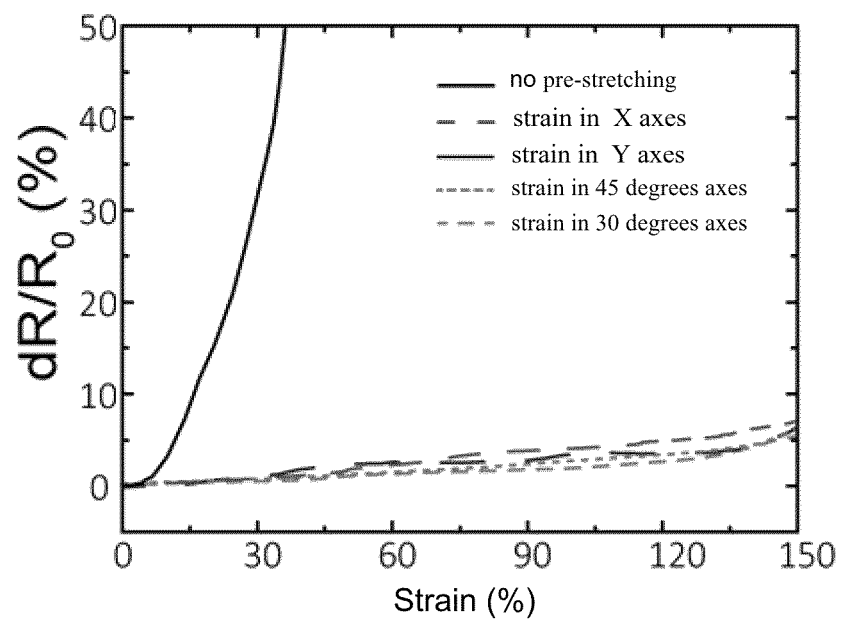
FIG. 6 are graphs of resistance vs. strain of the stretchable capacitor electrode-conductor structure in FIG. 4 pre-stretched in different directions.

Referring to FIG. 6, after the stretchable capacitor electrode-conductor structure of example 1 is stretched by 0-150% in the X, Y, 45 degrees, and 30 degrees axes, the resistance of the capacitor electrode in example 1 is only slightly increased. With 150% pre-stretching, the axial resistance of the capacitor electrode of example 1 increased by 6.5%, 6%, 5.9%, and 5.1% at 150% strain in the X, Y, 45 degrees, and 30 degrees axes, respectively. However, the resistance of the capacitor electrode without pre-stretching in comparative Example 1 increases rapidly as it was stretched along the axial direction of the carbon nanotube, the resistance increased by 50% at 40% strain. It can be seen that the resistance stability of the stretchable capacitor electrode-conductor structure under 0~150% strain in different directions is significantly better than that of the stretchable capacitor electrode-conductor structure without pre-stretching, which indicates that through the biaxial pre-stretching process, the strain-bearing ability in all directions of the stretchable capacitor electrode-conductor structure is greatly improved.

Figure 7:
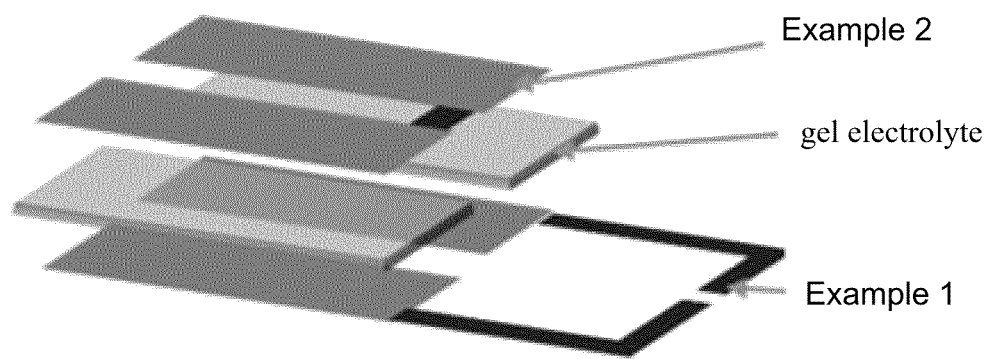
FIG. 7 is a structure schematic view of one embodiment of a stretchable supercapacitor.

Referring to FIG. 7, a stretchable supercapacitor was prepared by connecting the stretchable capacitor electrode-conductor structures of example 1 and example 2 in series. The method comprises coating a gel electrolyte layer on each of the capacitor electrodes of the stretchable capacitor electrode-conductor structure in example 1 and example 2, and drying in an oven at about 70° C. for about 1 h; bonding the stretchable capacitor electrode-conductor structure in example 1 and the stretchable capacitor electrode-conductor structure in example 1 together, the capacitor electrode in example 1 being aligned with the capacitor electrode in example 2 such that the gel electrolyte layer being located between the capacitor electrode of example 1 and the capacitor electrode of example 2; and removing all the gases, sealing the surrounding with PDMS, and curing the PDMS to obtain the stretchable supercapacitor.

A material of the gel electrolyte layer can be a aqueous gel electrolyte. A method of making the aqueous gel electrolyte comprise dissolving 0.6 g of polyvinyl alcohol (PVA) in 6 g of deionized water at about 80° C.; and then adding 0.6 g of 1M phosphoric acid ($H_3PO_4$) into the deionized water and stirring for about 5 hours to form the gel electrolyte.

Figure 8:
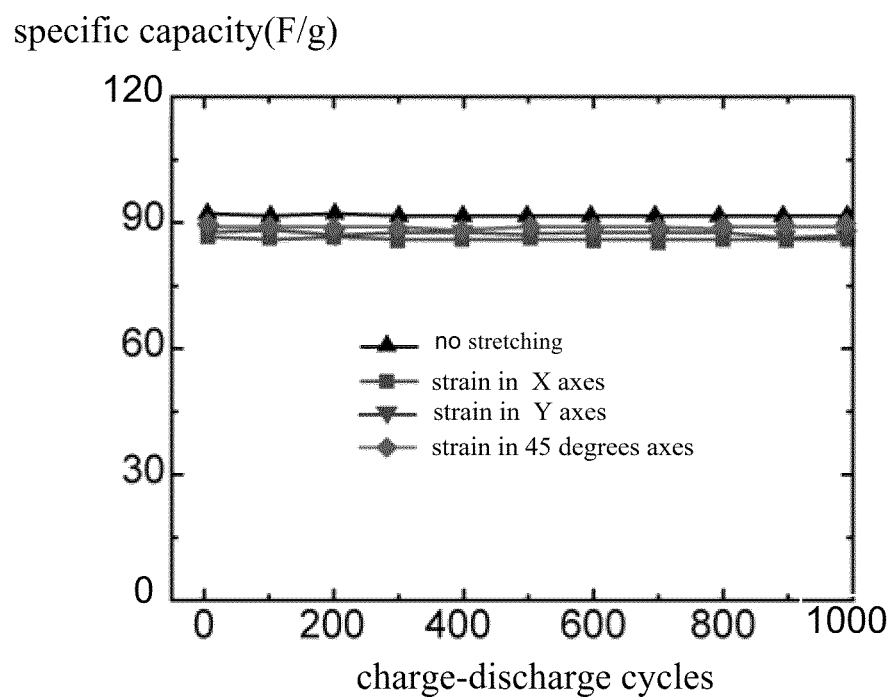
FIG. 8 are graphs of constant current charge-discharge test of one embodiment of a stretchable supercapacitor stretched in different directions.

FIG. 8 shows constant current charge-discharge test curves of the stretchable supercapacitor without strain and the stretchable supercapacitor stretched to 150% strain in different directions. It can be seen that the stretchable supercapacitor has good capacity retention in a constant current charge-discharge cycles, and the capacity retention is close to 100% after 1000 charge-discharge cycles. As the 150% strains were applied in X, Y, and 45 degrees axes, the capacity retention of the stretchable supercapacitor are 96.7%, 97.8% and 98.9% compared to the stretchable supercapacitor without strain. The 150% applied strain in different axes almost has no effect on the capacity of the stretchable supercapacitor. The high capacity retention demonstrates that stretchable supercapacitor has well resistance to stress stretchability. It can be further seen that an initial specific capacity is 0.91 F/g, which demonstrates that the capacitor electrodes of examples 1 and 2 have good electrochemical performance.

Figure 9:
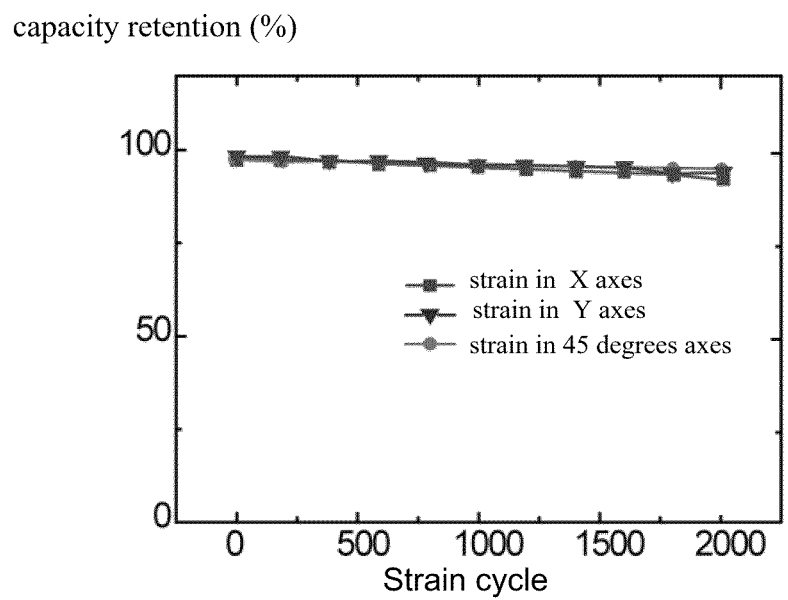
FIG. 9 are graphs of capacity retention vs. strain cycle of one embodiment of a stretchable supercapacitor stretched in different directions.

Referring to FIG. 9, the stretchable supercapacitor is tested with 2000 tensile cycles (0-150% strain) in different axes; a stretching speed is 1%/s. After 2000 tensile cycles in the X, Y, and 45° axes, the capacity retention of the stretchable supercapacitor are still 97%, 98.5%, and 98.6% compared to their initial value. The high capacity retention demonstrates that the stretchable supercapacitor has good resistance to repeated large strain stretching in different directions.

Figure 10:
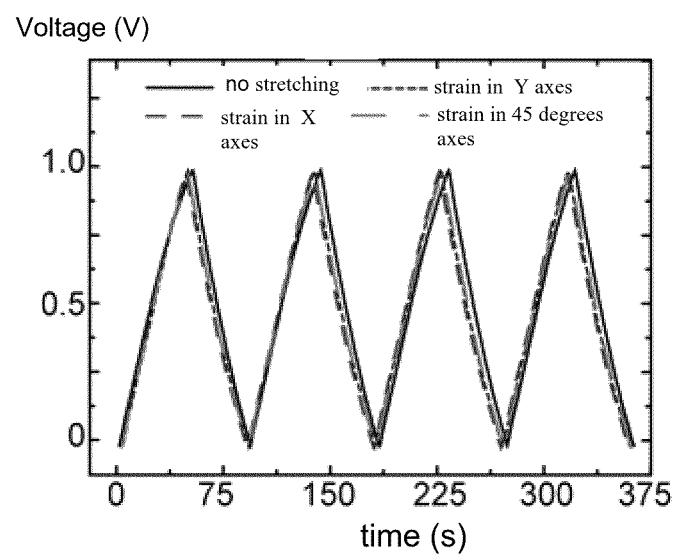
FIG. 10 are graphs of charge-discharge voltage vs. time of one embodiment of a stretchable supercapacitor before and after 2000 tensile cycles in different axial directions FIG. 11 are graphs of charge and discharge voltages vs. time of one embodiment of a stretchable supercapacitor under dynamic strain.

FIG. 10 shows that the charge-discharge curve of the stretchable supercapacitor after 2000 tensile cycles (0-150% strain) in different axial directions is almost identical to the charge-discharge curve of the stretchable supercapacitor without stretched, which demonstrates that repeated stretching in different axial directions has little effect on the electrode structure of the stretchable supercapacitor.

Figure 11:
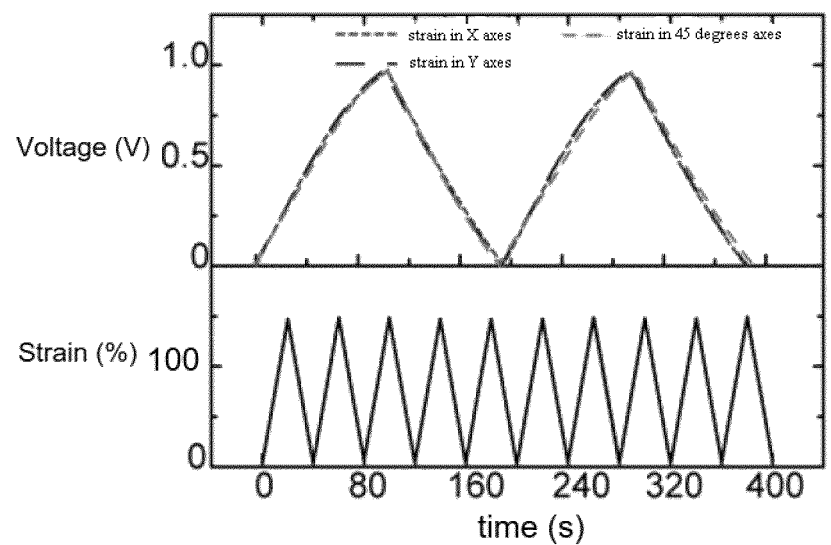
Figure 12:
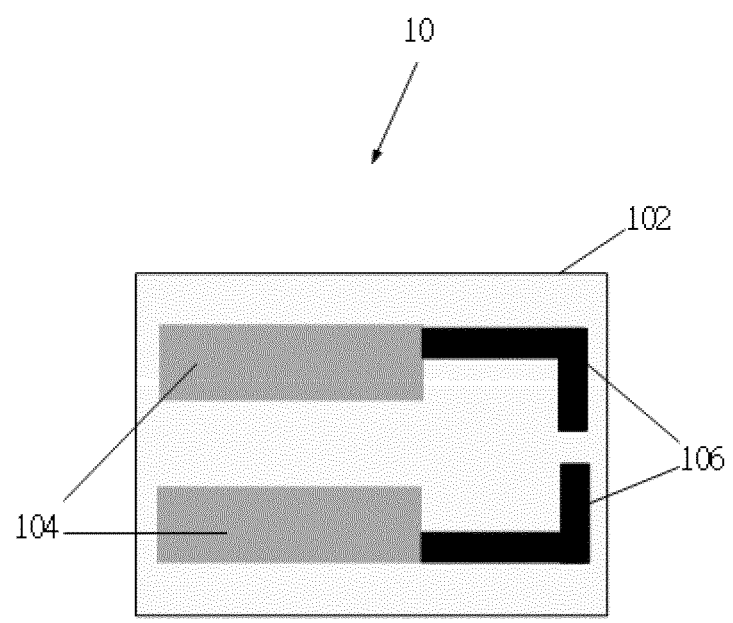
FIG. 12 is a structure schematic view of one embodiment of a stretchable capacitor electrode-conductor structure.

Referring to FIG. 11, in order to test the responsiveness to strain of the stretchable supercapacitor during charge-discharge process, the stretchable supercapacitor is dynamically stretched during charge-discharge process. While the stretchable supercapacitor is charged and discharged at 0.5 A/g, 0~150% cyclic strain is applied into the stretchable supercapacitor at 7.5%/s in different directions. It can be seen that the charging and discharging process of the stretchable supercapacitor is hardly affected by the cyclic strain, and the charge-discharge curve is the same as that of static stretchable supercapacitors. In X, Y, and 45 degrees axes, the specific capacity retention of the stretchable supercapacitor under cyclic strain reaches 94%, 96% and 97% respectively. The high specific capacity retention demonstrates that the stretchable supercapacitor has good tolerance to cyclic strain in different directions.

Figure 13:
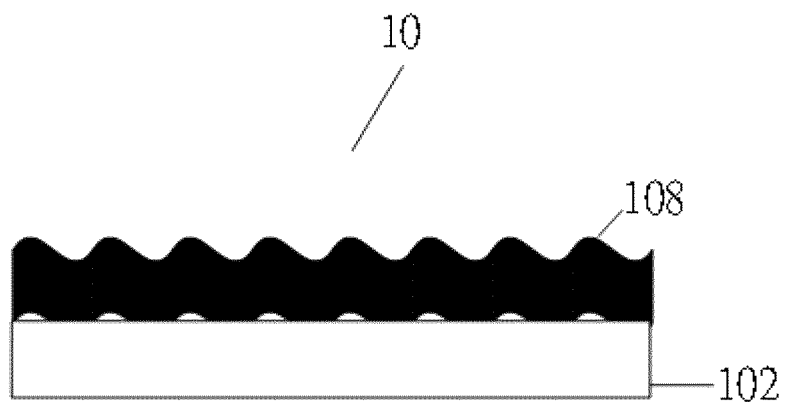
FIG. 13 is a schematic cross sectional view of the stretchable capacitor electrode-conductor structure in FIG. 12.

FIG. 13 shows that a surface of the stretchable capacitor electrode-conductor structure 10 comprises a plurality of wrinkles 108. The plurality of wrinkles 108 refers a number of wave shaped protuberances formed by the plurality of carbon nanotubes of the carbon nanotube film structure bending along a direction substantially perpendicular to the surface of the elastic substrate. Namely, some portions of the capacitor electrode 104 and the conductor structure 106 are higher than other portions of the capacitor electrode 104 and the conductor structure 106. When the stretchable capacitor electrode-conductor structure 10 is stretched in any one direction or simultaneously stretched in many different directions, the plurality of wrinkles can be unfolded in the stress direction; the carbon nanotubes of the stretchable capacitor electrode-conductor structure 10 are not broken, and the integrity of the stretchable capacitor electrode-conductor structure 10 is maintained. If a stress is less than or equal to a pre-stretching degree of the elastic substrate 102, the deformation of the plurality of wrinkles 108 is reversible, and thus the stretchable capacitor electrode-conductor structure 10 can be reused.

A material of the elastic substrate 102 can be selected from silicone rubber, polyvinyl chloride, polytetrafluoroethylene, polyurethane (PU), polyvinyl chloride (PVC), polydimethylsiloxane (PDMS) and the like. In one embodiment, the elastic substrate 102 is a rectangular PDMS substrate with a thickness of 1 mm. The elastic substrate 102 can be optional. In one embodiment, the stretchable capacitor electrode-conductor structure 10 does not have the elastic substrate 102, just comprises the capacitor electrode 104 and the conductor structure 106. In this embodiment, the plurality of carbon nanotube layers comprises a first outermost carbon nanotube layer, a second outermost carbon nanotube layer, and at least one internal carbon nanotube layer located between the first outermost carbon nanotube layer and the second outermost carbon nanotube layer; a first quantity of the first super-aligned carbon nanotube film in each of the first outermost carbon nanotube layer and the second outermost carbon nanotube layer is larger than a second quantity of the first super-aligned carbon nanotube film in each of the at least one internal carbon nanotube layer.

The super-aligned carbon nanotube film is pure and substantially free of impurities, and thus the super-aligned carbon nanotube film has a large viscosity, the capacitor electrode 104 and the conductor structure 106 can be fixed on the surface of the elastic substrate 102 by the viscosity of the plurality of super-aligned carbon nanotube films.

In one embodiment, the carbon nanotubes are differently aligned between adjacent two of the super-aligned carbon nanotube films of each of the plurality of carbon nanotube layer to form a grid structure, and alignment directions of the carbon nanotubes between adjacent two of the super-aligned carbon nanotube films of each of the plurality of carbon nanotube layer intersect with each other/are different. An angle of the alignment directions of the carbon nanotubes between adjacent two of the super-aligned carbon nanotube films of each of carbon nanotube layer is not limited. The carbon nanotubes are differently aligned between adjacent two of the super-aligned carbon nanotube films of the conductor structure 106 to form a grid structure, and alignment directions of the carbon nanotubes between adjacent two of the super-aligned carbon nanotube films of the conductor structure 106 intersect with each other/are different. An angle of the alignment directions of the carbon nanotubes between adjacent two of the super-aligned carbon nanotube films of the conductor structure 106 is not limited. In one embodiment, the angle of the alignment directions of the carbon nanotubes between adjacent two of the super-aligned carbon nanotube films of each of carbon nanotube layer is about 90 degrees; the angle of the alignment directions of the carbon nanotubes between adjacent two of the super-aligned carbon nanotube films of the conductor structure 106 is about 90 degrees.

The number of super-aligned carbon nanotube films in each of the plurality of carbon nanotube layers can be equal or unequal. In one embodiment, each of the number of super-aligned carbon nanotube films in the carbon nanotube layer directly contacting with the elastic substrate 102 and the number of super-aligned carbon nanotube films in the outermost carbon nanotube layer is larger than the number of super-aligned carbon nanotube films in an internal carbon nanotube layer. The outermost carbon nanotube layer refers to the carbon nanotube layer which is the farthest from the elastic substrate 102. The internal carbon nanotube carbon nanotube layer refers to the carbon nanotube carbon nanotube layer located between the carbon nanotube layer being in direct contact with the elastic substrate 102 and the outermost carbon nanotube layer.

In one embodiment, the capacitor electrode 104 comprises 12 carbon nanotube layers, and the active material is distributed between adjacent carbon nanotube layers. Each of the carbon nanotube layer directly contacting with the elastic substrate 102 and the outermost carbon nanotube layer comprises 6 super-aligned carbon nanotube films. The internal carbon nanotube layer comprises 2 super-aligned carbon nanotube films.

The active substance can be any capacitor electrode active material. In one embodiment, the active substance is activated carbon powder.

A plurality of microporous can be formed by the plurality of super-aligned carbon nanotube films of the carbon nanotube layer. When a particle size of the active substance is smaller than a size of the microporous, the active substance can be partially embedded in the carbon nanotube layer.

When the stretchable capacitor electrode-conductor structure 10 is stretched in any one direction or simultaneously stretched in many different directions, the plurality of wrinkles 108 can be unfolded in the stress direction; the carbon nanotubes of the stretchable capacitor electrode-conductor structure 10 are not broken, and the integrity of the stretchable capacitor electrode-conductor structure 10 is maintained. If the stress is less than or equal to the pre-stretching degree of the elastic substrate 102, the deformation of the plurality of wrinkles 108 is reversible, and thus the stretchable capacitor electrode-conductor structure 10 can be reused.

An areal density of the active substance in the capacitor electrode 104 ranges from about 3 mg/cm$^2$ to about 8 mg/cm$^2$. In one embodiment, the areal density of the active substance in the capacitor electrode 104 is about 5 mg/cm$^2$.

In some embodiments, when the stretchable capacitor electrode-conductor structure 10 is applied, an angle is formed between the stretching direction and the extending direction of the carbon nanotubes of the stretchable capacitor electrode-conductor structure 10. In one embodiment, when the stretchable capacitor electrode-conductor structure 10 is applied, the angle formed between the stretching direction and the extending direction of the carbon nanotubes of the stretchable capacitor electrode-conductor structure 10 is larger than or equal to 30 degrees and less than or equal to 60 degrees. When the angle between the extending direction of the carbon nanotubes of the stretchable capacitor electrode-conductor structure 10 and the stretching direction is formed, the conductive network of the carbon nanotube layer can absorb the stress by its own deformation, and thus the stretchable capacitor electrode-conductor structure 10 is not easy to be pulled broken, and an increasing rate of resistance is slowed down.

The shape of the conductor structure 106 is not limited and can be selected according to actual needs.

One embodiment of the present application in relation to a stretchable supercapacitor. The stretchable supercapacitor comprises the stretchable capacitor electrode-conductor structure 10, an electrolyte and a packaging structure. The electrolyte is coated on a surface of the capacitor electrode 104. The packaging structure is used to encapsulate the stretchable capacitor electrode-conductor structure and the electrolyte.

The electrolyte is gel electrolyte. In one embodiment, the electrolyte is an aqueous gel electrolyte. The aqueous gel electrolyte is prepared by dissolving polyvinyl alcohol in deionized water and then adding phosphoric acid. In one embodiment, a method of preparing the aqueous gel electrolyte comprises dissolving 0.6 g of polyvinyl alcohol (PVA) in 6 g of deionized water at about 80° C.; and then adding 0.6 g of 1M phosphoric acid ($H_3PO_4$) into the deionized water and stirring for about 5 hours to form the gel electrolyte.

A material of the packaging structure can be selected from any flexible material. In one embodiment, the material of the packaging structure is PDMS.

It is to be understood that the above-described embodiments are intended to illustrate rather than limit the present disclosure. Variations may be made to the embodiments without departing from the spirit of the present disclosure as claimed. Elements associated with any of the above embodiments are envisioned to be associated with any other embodiments. The above-described embodiments illustrate the scope of the present disclosure but do not restrict the scope of the present disclosure.

Depending on the embodiment, certain of the steps of a method described may be removed, others may be added, and the sequence of steps may be altered. The description and the claims drawn to a method may include some indication in reference to certain steps. However, the indication used is only to be viewed for identification purposes and not as a suggestion as to an order for the steps.

What is claimed is:

1. A stretchable capacitor electrode-conductor structure comprising:
    a capacitor electrode comprising a plurality of carbon nanotube layers stacked with each other, and an active substance layer between adjacent two of the carbon nanotube layers, each of the plurality of carbon nanotube layers comprising a plurality of first super-aligned carbon nanotube films stacked with each other, and each of the plurality of first super-aligned carbon nanotube films comprising a plurality of first carbon nanotubes substantially parallel with each other; and
    a conductor structure comprising a plurality of second super-aligned carbon nanotube films stacked with each other, and each of the plurality of second super-aligned carbon nanotube films comprising a plurality of second carbon nanotubes substantially parallel with each other,
    wherein the capacitor electrode and the conductor structure are formed by an integrated molding, and a surface of the stretchable capacitor electrode-conductor structure comprises a plurality of wrinkles.

2. The stretchable capacitor electrode-conductor structure of claim 1, wherein the first carbon nanotubes are differently aligned between adjacent two of the first super-aligned carbon nanotube films, and the second carbon nanotubes are differently aligned between adjacent two of the second super-aligned carbon nanotube films.

3. The stretchable capacitor electrode-conductor structure of claim 2, wherein alignment directions of the first carbon nanotubes between adjacent two of the first super-aligned carbon nanotube films intersect at angle of approximately 90 degrees.

4. The stretchable capacitor electrode-conductor structure of claim 2, wherein alignment directions of the second carbon nanotubes between adjacent two of the second super-aligned carbon nanotube films intersect at angle of approximately 90 degrees.

5. The stretchable capacitor electrode-conductor structure of claim 1, wherein the plurality of carbon nanotube layers comprises a first outermost carbon nanotube layer, a second outermost carbon nanotube layer, and at least one internal carbon nanotube layer between the first and the second outermost carbon nanotube layers; each of the first and the second outermost carbon nanotube layers comprises a first quantity of the super-aligned carbon nanotube films; each of the internal carbon nanotube layer comprises a second quantity of the super-aligned carbon nanotube films; the first quantity is larger than the second quantity.

6. The stretchable capacitor electrode-conductor structure of claim 5, wherein each of the first and the second outermost carbon nanotube layers comprises six (6) of the super-aligned carbon nanotube films.

7. The stretchable capacitor electrode-conductor structure of claim 6, wherein each of the at least one internal carbon nanotube layer comprises two (2) of the super-aligned carbon nanotube films.

8. The stretchable capacitor electrode-conductor structure of claim 1, wherein the capacitor electrode comprises twelve (12) of the carbon nanotube layers stacked with each other.

9. The stretchable capacitor electrode-conductor structure of claim 1, further comprising an elastic substrate, wherein each of the capacitor electrode and the conductor structure is on and in direct contact with a surface of the elastic substrate.

10. The stretchable capacitor electrode-conductor structure of claim 9, wherein a material of the elastic substrate is silicone rubber, polyvinyl chloride, polytetrafluoroethylene, polyurethane, polyvinyl chloride, or polydimethylsiloxane.

11. The stretchable capacitor electrode-conductor structure of claim 1, wherein microporous are defined by the first plurality of super-aligned carbon nanotube films, and particle sizes of an active substance of the active substance layer are smaller than sizes the microporous, and the active substance layer is partially embedded in the plurality of carbon nanotube layers.

12. The stretchable capacitor electrode-conductor structure of claim 1, wherein a surface density of the active substance layer ranges from approximately 3 $mg/cm^2$ to approximately 8 $mg/cm^2$.

13. The stretchable capacitor electrode-conductor structure of claim 1, wherein a material of the active substance layer is capacitor electrode active material or electrode active material precursor material.

14. The stretchable capacitor electrode-conductor structure of claim 1, wherein the first super-aligned carbon nanotube films in the capacitor electrode and the second super-aligned carbon nanotube films in the conductor structure are pure and free of impurities.

15. A stretchable supercapacitor comprising:
    a stretchable capacitor electrode-conductor structure comprising:

a capacitor electrode comprising a plurality of carbon nanotube layers stacked with each other, and an active substance layer between adjacent two of the carbon nanotube layers, each of the plurality of carbon nanotube layers comprising a plurality of first super-aligned carbon nanotube films stacked with each other, and each of the plurality of first super-aligned carbon nanotube films comprising a plurality of first carbon nanotubes substantially parallel with each other; and a conductor structure comprising a plurality of second super-aligned carbon nanotube films stacked with each other, and each of the plurality of second super-aligned carbon nanotube films comprising a plurality of second carbon nanotubes substantially parallel with each other;

an electrolyte coated on a surface of the capacitor electrode; and a packaging structure encapsulating the stretchable capacitor electrode-conductor structure and the electrolyte, wherein the capacitor electrode and the conductor structure are formed by integrated molding, and a surface of the stretchable capacitor electrode-conductor structure comprises a plurality of wrinkles.

16. The stretchable supercapacitor of claim 15, wherein the electrolyte is an aqueous gel electrolyte.

17. The stretchable supercapacitor of claim 16, wherein the aqueous gel electrolyte is prepared by dissolving polyvinyl alcohol in deionized water and then adding phosphoric acid to the deionized water.

18. The stretchable supercapacitor of claim 15, wherein a material of the packaging structure is a flexible material.

19. The stretchable supercapacitor of claim 18, wherein the material of the packaging structure is polydimethylsiloxane.

* * * * *